J. H. Littlefield.

Press and Strainer.

No. 3,702. Reissued Nov. 2, 1869.

Witnesses;

L. A. Yeatman

Geo. Coe

Inventor;

Joseph H. Littlefield, per Alexander D. Mason

Attys.

N. PETERS, PHOTO-LITHOGRAPHER, WASHINGTON, D. C.

United States Patent Office.

JOSEPH H. LITTLEFIELD, OF CAMBRIDGE, MASSACHUSETTS.

*Letters Patent No.* 78,981, *dated June* 16, 1868; *reissue No.* 3,702, *dated November* 2, 1869.

IMPROVED PRESS AND STRAINER.

The Schedule referred to in these Letters Patent and making part of the same.

*To all whom it may concern:*

Be it known that I, JOSEPH H. LITTLEFIELD, of Cambridge, in the county of Middlesex, and State of Massachusetts, have invented certain new and useful Improvements in a Combined Press and Strainer; and I do hereby declare the following to be a full and correct description of the same, reference being had to the accompanying drawings, in which—

Figure 2:
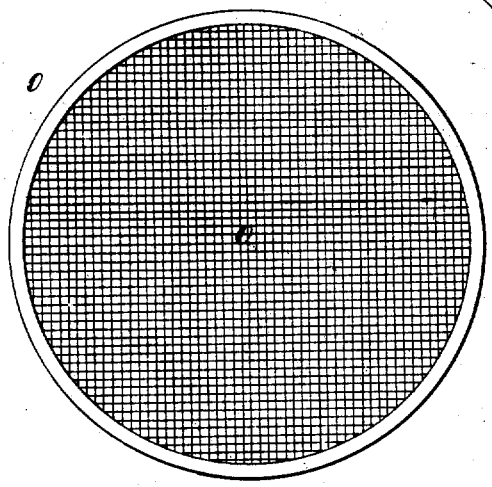
Figure 2 is a top view or plan of one of the sieves or strainers.
Figure 3:
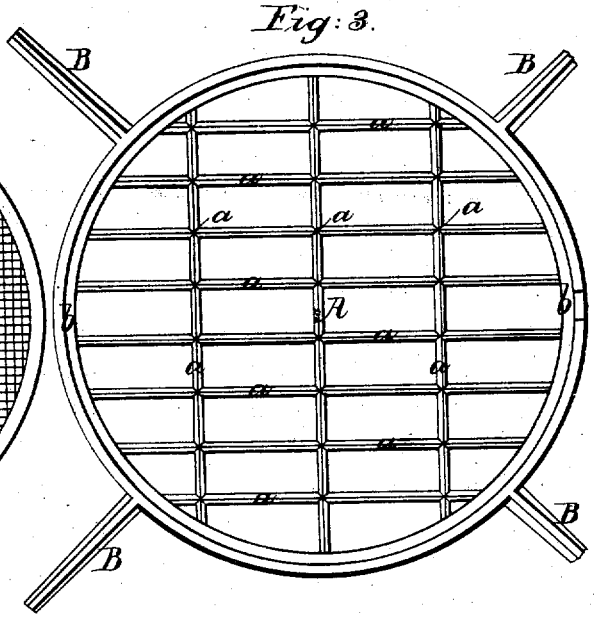
Figure 3 is a similar view of the grated bottom or frame.
Figure 1:
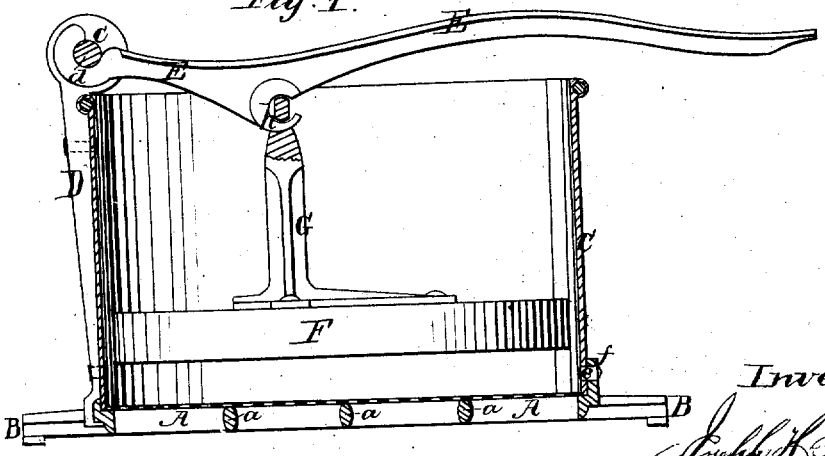
Figure 1 is a side view, in section, of my machine.

The same part is marked by the same letter of reference wherever it occurs.

My improvements relate to a combined press and strainer, intended chiefly for domestic use, and applicable to the pressing, sifting, and straining of lard, tallow, meats, vegetables, curds, fruits, sauces, &c.

Their object is to render the implement strong, simple, easily cleansed, portable, and applicable to a great variety of purposes.

They consist principally in providing the flanged rim or base, to which the lower edge of the can or containing-vessel is attached, with projecting arms, which enable it to be supported over vessels of sizes larger than that of the can, and with a strong open grating, for the support of the sieves or strainers, enabling sieves of the finest character to be used with safety, without offering any obstruction to the descent of the watery or liquid portion of the matters subjected to the compressing action of the follower.

They further consist in the combination with the grated base, before referred to, of a bottomless case or can, a detachable lever, and a plunger or follower, with its standard, all as hereinafter more particularly set forth.

To enable others skilled in the art to make and use my improved press and strainer, I will proceed to describe its construction and operation.

A stout stand or frame, A, has a flange, *b*, which supports the lower rim of the bottomless can C, which is riveted to ears *f*, projecting from the stand, or fastened to it in any other suitable manner.

From the frame A, arms B B project radially, to any desired length, to span a pot, pan, or other vessel intended to receive the strained liquids.

The can or vessel C may be made of any form, of tin, wood, zinc, or other suitable material, and open at top and bottom. In size, it must correspond with the base to which it is attached.

On one side of it, I secure a strong stay, D, hooking at its lower end under the frame A, or otherwise securely connected to it, and projecting far enough above the top of can C, to enable the ears *c* and pintle *d*, on its upper end, to engage with the hooked end of the long lever E, by means of which the compressive force is applied to the follower F.

The stay D serves to attach the can C to the frame A at one point, while it is attached to it at as many other points as may be necessary by means of ears *f*.

The sides of frame A are united by the open grating *a a*, which may be composed of any suitable number of bars, of any desired form, and have openings or meshes of any required size or shape. This grating forms an open-work bottom to the can C, and on it is supported a strainer, O, of corresponding form, and of any degree of fineness.

I prefer to use several grades of strainers for each case or can, so as to adapt the press readily to the character of the material to be operated upon. They may be fine, medium, or coarse, or of any intermediate grade, and can be removed and replaced at will.

They may, if necessary, to give them a good finish be bound around the edge with narrow tin, copper, or zinc, or a small wire neatly rolled in.

If preferred, the strainer may be made in the shape of a dish or case, with perforated sides and bottom, and so placed in the outside case C, as to leave a space between them, in order to allow the material required to be strained to pass through the sides and drop down between the dishes, and through the grating, as well as through the bottom, the inner strainer being provided with guards, to hold it central within the outer case C.

The follower F, which serves to press the materials through the strainer, I make of wood or metal, or both combined, and provide with an upright standard, G, having an oblong opening in its upper end, to receive the hook *h*, projecting from the under side of the operating-lever E. This mode of connection gives the requisite play to the follower, and allows of its ready detachment for removal from the case.

The lever E is made strong, preferably of cast-iron, and of the general shape shown. It has a hook on its fixed end, for the reception of the pintle *d*, at the upper end of the stay D, and a second hook, *h*, on its under side, by which it is attached to the upper end of standard G. It can readily be detached from either or both of these connections, when it is desired to remove the follower from the press.

The operation is as follows:

The press being placed over the vessel in which the strained liquids are to be received, a sieve or strainer of the proper grade is inserted in the can C, and rests upon the grating *a*. The articles to be pressed or strained are then introduced into the can C to a suitable depth, the follower F put in place, and the lever E connected to the stay D and standard G. Suitable power is now applied to the lever E to force down the follower F upon the contents of the can, and thus accomplish the straining or pressing-operation.

Having thus fully described my improvements,

What I claim, and desire to secure by Letters Patent, is—

1. A combined press and strainer, having a substantial rim or base, A, provided with a strong open grating, *a a*, for the support of the sieve or strainer O, when all these parts are constructed and arranged substantially as described.

2. The grated base A, provided with a flange and ears, for the attachment of the can C, and with radial arms, for the purpose of spanning a large vessel, as set forth.

3. The frame A, with grates *a a* and arms B B, in combination with the strainer O and bottomless can C, stay D, lever E, standard G, and follower F, constructed, arranged, and operating substantially as and for the purposes specified.

The above specification of my said invention, signed and witnessed, at Boston, this 11th day of August, A. D. 1869.

JOSEPH H. LITTLEFIELD.

Witnesses:
A. W. ADAMS,
CHAS. B. FLANERY.